United States Patent Office 3,345,020
Patented Oct. 3, 1967

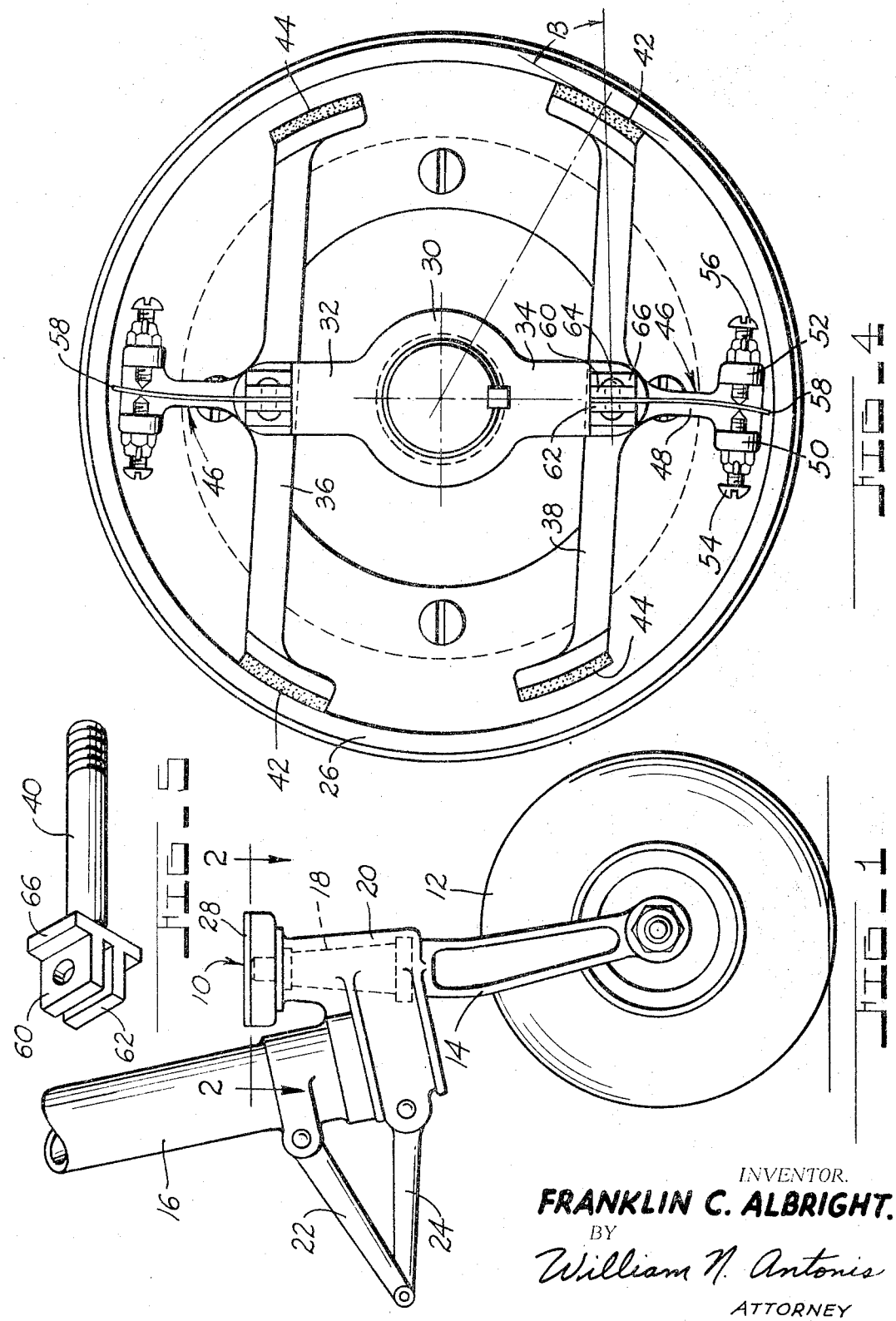

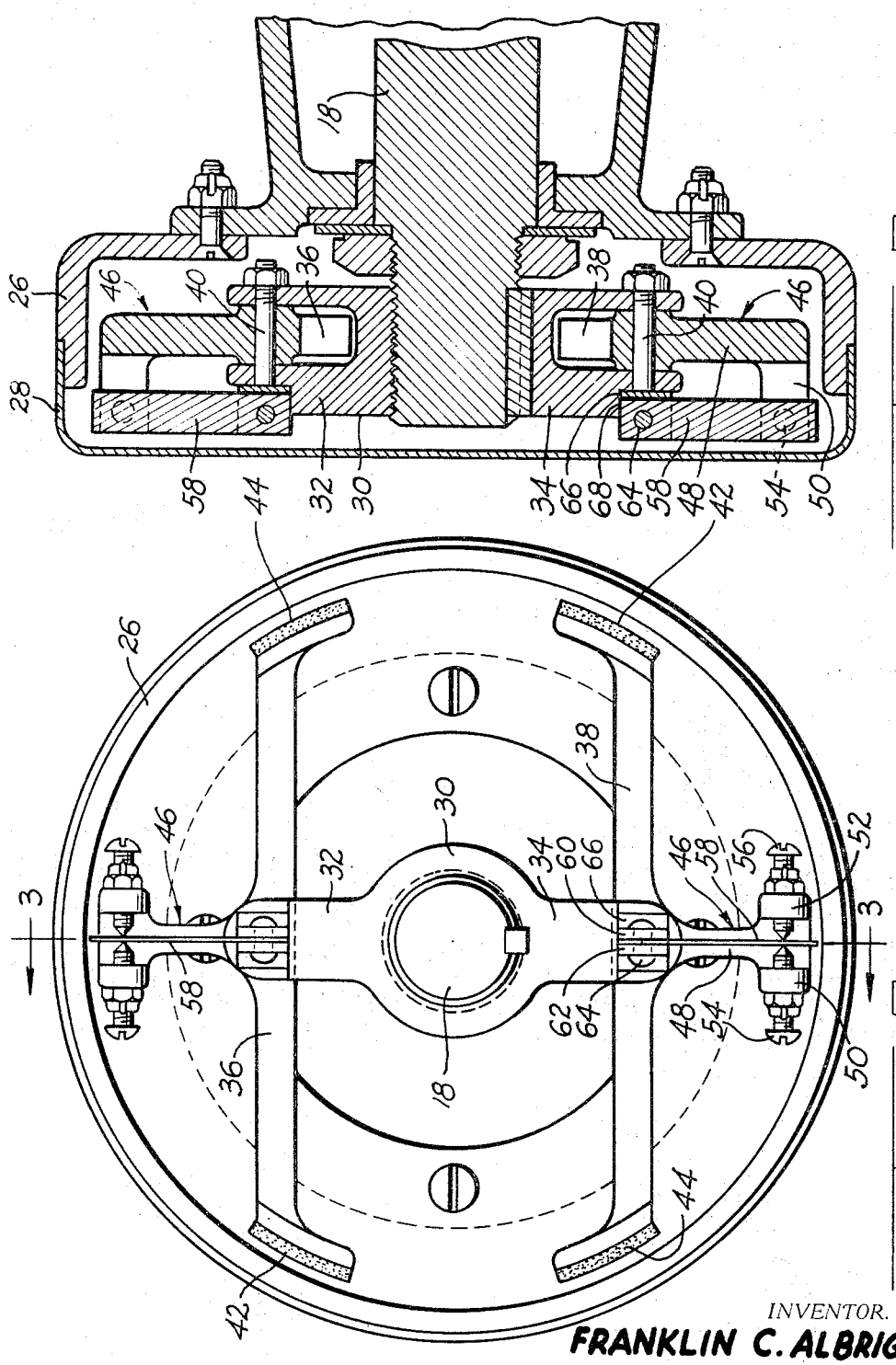

3,345,020
FRICTION SHIMMY DAMPER
Franklin C. Albright, South Bend, Ind., assignor to The Bendix Corporation, a corporation of Delaware
Filed Mar. 18, 1966, Ser. No. 535,595
8 Claims. (Cl. 244—103)

ABSTRACT OF THE DISCLOSURE

The following relates to a friction type shimmy damper mechanism, for use with a fully castering aircraft wheel, which is effective only at angular velocities which are greater than those encountered during taxiing. The mechanism includes a brake drum, a support member connected to the wheel for concomitant angular movement therewith, friction pads connected to and movable with the support member, and spring means for preventing the friction pads from engaging the brake drum, except at angular velocities above a predetermined value.

In helicopters, VTOL aircraft, or in any aircraft having a fully castering wheel assembly, it is necessary to dampen undesirable wheel shimmy. Since, in such aircraft the wheel is usually designed to rotate a full 360°, it is necessary that damping be provided throughout the entire angle. Normally, it is advisable to provide as free a motion (friction free) as possible for ordinary rotation of the wheel and to apply a restriction or dampening to the movement of the wheel only when shimmy or violent angular motion of the wheel occurs.

Accordingly, it is an object of this invention to provide a shimmy damper which will be operable throughout the full 360° of wheel rotation.

Another object of this invention is to provide a suitable friction damper for arresting shimmy in a castering wheel.

A further object of this invention is to provide a friction shimmy damper for use with a fully castering wheel which is responsive only to angular velocities and/or angular accelerations which are greater than those normally encountered in taxiing.

More specifically, it is an object of this invention to provide a wheel shimmy damper mechanism comprising a brake drum, support means located within said brake drum and operatively connected to said wheel for concomitant angular movement therewith, friction means operatively connected to and movable with said support means for engagement with said brake drum, and resilient means for preventing said friction means from engaging said brake drum at angular velocities below a predetermined value but permitting said friction means to engage said brake drum at angular velocities above said predetermined value.

The above and other objects and features of the invention will become apparent from the following description of the mechanism taken in connection with the accompanying drawings which form a part of this disclosure and in which:

FIGURE 1 is a side elevational view of a conventional castered wheel assembly which includes the novel friction shimmy damper;

FIGURE 2 is a sectional view taken along line 2—2 of FIGURE 1;

FIGURE 3 is a sectional view taken along line 3—3 of FIGURE 2;

FIGURE 4 is a sectional view similar to FIGURE 2 showing the friction shimmy damper in operation; and FIGURE 5 is a perspective view of one of the components of the shimmy damper.

Referring to FIGURE 1, it will be seen that the numeral 10 designates a shimmy damper which is installed on a conventional castered wheel assembly. More specifically, the assembly includes a wheel 12 suitably mounted for rotation on a wheel fork 14 carried at the lower end of a supporting strut 16. The strut is of a type known in the art, and contains spring means or hydraulic fluid as resistance means for damping movement of the fork and wheel to absorb the shock of vertical movement of the wheel. A spindle 18, which is part of the wheel fork 14, is suitably supported in a housing 20. Links 22 and 24 are hinged together at one end and have the other ends thereof connected, respectively, to a strut 16 and housing 20.

The shimmy damper 10 includes a housing 26 which is suitably mounted on top of the spindle housing 20 and a cover 28 for the housing. Located within the housing 26 is a collar 30 having two diametrically opposed bifurcated support arms 32 and 34 extending therefrom, said collar being keyed or otherwise suitably connected to the end of spindle 18 for rotation therewith. A pair of cross beams 36 and 38 are pivotally connected, through means of bolts 40 (shown in FIGURE 5), to the ends of support arms 32 and 34, respectively. Located at the ends of each cross beam are friction pads 42 and 44 which are shaped so that uniform engagement with the housing 26, which in effect is a brake drum, will occur upon pivotal rotation of the cross beams about bolts 40. Although in FIGURES 2 and 4, the spacing between the friction pads and the brake drum has been exaggerated to more clearly illustrate the relative pivotal movement of the cross beams, it will be understood that in actuality there is only a very small clearance between the friction pads or brake lining and the drum.

In order to maintain the cross beams in a centered or neutral position, each cross beam is provided with a radially extending spring centering mechanism which is designated generally by the numeral 46. Each of these spring centering mechanisms, which are an integral part of the cross beams, include a radially extending member 48 having a pair of lugs 50 and 52 extending therefrom and a pair of adjusting screws 54 and 56 threadedly engaging and extending through each of the lugs 50 and 52, respectively. A leaf spring 58 has one end located between two flat parallel bolt head projections 60 and 62 and is fixedly connected thereto by any suitable means, such as a rivet 64. The other end of the leaf spring is located between the adjusting screws 54 and 56 so that the cross beam associated therewith can be positioned in the desired centered or neutral position by rotation of the adjusting screws. It will be noted that the bolt head 66 is square and abuts a shoulder 68 formed on the support arm so as to prevent rotation of the bolt with respect to its associated support arm.

Operation of the shimmy damper will be as follows: Any rotation of the wheel 12 and spindle 18 will cause concomitant rotation of the collar 30 and its support arms 32 and 34. The cross beams 36 and 38, likewise, will move with the support arms to which they are attached, but will not pivot about bolts 40 at low angular velocities, since the leaf springs 58 are designed to prevent such pivotal movement of the cross beams at such low angular velocities. In other words, at low angular velocities the friction pads 42 or 44 will not make contact with the brake drum 26. However, for rapid angular velocities, and especially for high angular acceleration, the cross beams 36 and 38 will pivot about bolts 40 so that one of the friction pads of each of the cross beams will make contact with the brake drum and produce a retarding force. Thus, if the angular acceleration is in one direction, the cross beams will pivot so that the friction pads 42 will contact the brake drum, as shown in FIGURE 4.

If the angular acceleration is in the opposite direction, then the cross beams will pivot so that the friction pads 44 will contact the brake drum. The retarding force, which is produced, is self-energizing and depends on the friction coefficient and the angle B. Furthermore, this retarding force will continue until the direction of wheel rotation is reversed or rotation has stopped. It will further be understood that the mass of each of the adjusting mechanism 46 will act as a pendulum and that any angular accelerations acting thereon as a result of rotation of the spindle 18 will add to the force causing pivotal movement of the cross beams 36 and 38.

It will be obvious to those skilled in the art that in any oscillating wheel assembly, the angular velocities and/or the angular accelerations will be greater than those normally encountered during taxiing of the aircraft. Thus by utilizing a shimmy damper mechanism of the type described having the proper spring strength, a known friction coefficient of the lining drum combination, and the most suitable angle B, the mechanism will effectively eliminate the shimmy in a castering wheel assembly.

The several practical advantages which flow from this type of an arrangement are believed to be obvious from the foregoing description, and other advantages may suggest themselves to those who are familiar with the art to which this invention relates.

Furthermore, although this invention has been described in connection with a specific embodiment, it will be obvious to those skillled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. In an aircraft castering wheel assembly having a housing member, a wheel, and a wheel-carrying member operatively connected to said housing member for relative angular movement with respect therto, a wheel shimmy damper mechanism comprising a brake drum operatively connected to said housing member, support means located within said brake drum and operatively connected to said wheel-carrying member for concomitant angular movement therewith, said support means including a collar having a plurality of arms radially extending therefrom, a cross beam pivotally connected at the center thereof to the end of each of said support arms, a friction pad located at each end of said cross beam for engagement with said brake drum, and means for preventing said friction pads from engaging said brake drum at angular velocities below a predetermined value but permitting said friction pads to engage said brake drum at angular velocities above said predetermined value.

2. The combination defined in claim 1, wherein angular velocities above said predetermined value cause only one friction pad of each of said cross beams to engage said brake drum upon pivotal movement of said cross beams with respect to said support arms.

3. The combination defined in claim 2, wherein said means for preventing engagement of said friction pads with said brake drum includes resilient means operatively connected between said support arms and said cross beams for preventing pivotal movement therebetween.

4. The combination defined in claim 3, wherein said resilient means includes a plurality of leaf springs each of which has one end thereof fixedly connected to one of said support arms and the other end thereof fixedly connected to one of said cross beams.

5. The combination defined in claim 4, wherein the connections between said cross beams and said other end of said leaf springs each includes a radially extending member having adjusting means at the end thereof and in contact with the associated leaf spring for centering the associated cross beam and maintaining the desired clearance between the cross beam friction pads and the brake drum.

6. The combination defined in claim 5, wherein said adjusting means includes a first adjusting screw located on one side and in contact with the associated leaf spring and a second adjusting screw located on the other side and in contact with said associated leaf spring.

7. The combination defined in claim 6, wherein the pivotal connection between each of said cross beams and said support arms includes a bolt which is fixedly connected to the associate support arm, and each of said leaf springs has said one end rigidly connected to the head of the associated bolt.

8. The combination defined in claim 4, wherein said collar has only two diametrically opposed support arms.

References Cited

UNITED STATES PATENTS 2,325,895   8/1943   Wallace _____ 16—35

DUANE A. REGER, *Primary Examiner.*